US012317213B2

(12) United States Patent
Agrawal et al.

(10) Patent No.: US 12,317,213 B2
(45) Date of Patent: May 27, 2025

(54) DELAYING UE RADIO CAPABILITY ID (URCID) UPDATE FOR EPLMN

(71) Applicant: QUALCOMM Incorporated, San Diego, CA (US)

(72) Inventors: Mona Agrawal, San Diego, CA (US); Haris Zisimopoulos, London (GB); Arvind Vardarajan Santhanam, San Diego, CA (US); Lenaig Genevieve Chaponniere, La Jolla, CA (US); Gavin Bernard Horn, La Jolla, CA (US); Masato Kitazoe, Tokyo (JP); Osama Lotfallah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/322,186

(22) Filed: May 17, 2021

(65) Prior Publication Data

US 2021/0360565 A1 Nov. 18, 2021

Related U.S. Application Data

(60) Provisional application No. 63/026,635, filed on May 18, 2020.

(51) Int. Cl.
*H04W 60/00* (2009.01)
*H04W 36/00* (2009.01)
(Continued)

(52) U.S. Cl.
CPC ......... *H04W 60/00* (2013.01); *H04W 68/005* (2013.01); *H04W 76/10* (2018.02)

(58) Field of Classification Search
CPC . H04W 36/0033; H04W 48/18; H04W 60/00; H04W 60/04; H04W 68/005;
(Continued)

(56) References Cited

U.S. PATENT DOCUMENTS 11,570,615 B2\* 1/2023 Jin .................. H04W 8/245
2019/0124181 A1 4/2019 Park et al.
(Continued)

FOREIGN PATENT DOCUMENTS

CN 111010263 A 4/2020
WO 2020073849 A1 4/2020

OTHER PUBLICATIONS

International Search Report and Written Opinion—PCT/US2021/032902—ISA/EPO—Sep. 29, 2021.
(Continued)

*Primary Examiner* — Khawar Iqbal
(74) *Attorney, Agent, or Firm* — Patterson+ Sheridan, L.L.P.

(57) ABSTRACT

Aspects of the present disclosure relate to wireless communications, and more particularly, to techniques for optimizing procedures to update a UE radio capability ID (URCID) when a UE moves to a new Public Land Mobile Network (PLMN) within a registration area. The techniques may help avoid unnecessary signaling traffic and reduce UE power consumption. An example method performed by a user equipment (UE) generally includes receiving at least one URCID assigned by a first PLMN; and taking one or more actions to delay or avoid updating the URCID when moving to a second PLMN in a same registration area as the first PLMN.

24 Claims, 9 Drawing Sheets

(51) Int. Cl.
*H04W 68/00* (2009.01)
*H04W 76/10* (2018.01)

(58) Field of Classification Search
CPC ....... H04W 76/10; H04W 76/11; H04W 8/22; H04W 8/24
See application file for complete search history.

(56) References Cited

U.S. PATENT DOCUMENTS

| | | | |
|---|---|---|---|
| 2021/0250890 A1* | 8/2021 | Won | H04W 76/50 |
| 2021/0410107 A1* | 12/2021 | Park | H04W 68/02 |
| 2022/0022103 A1* | 1/2022 | Prakasam | H04W 60/00 |
| 2022/0078605 A1* | 3/2022 | Alnas et al. | H04W 8/22 |
| 2022/0110083 A1* | 4/2022 | Wang | H04W 36/305 |
| 2022/0132287 A1* | 4/2022 | Prabhakar | H04W 8/245 |
| 2022/0201571 A1* | 6/2022 | Kang | H04W 36/00837 |
| 2022/0240213 A1* | 7/2022 | Ly | H04W 48/18 |
| 2022/0256329 A1* | 8/2022 | Alnås | H04W 8/26 |
| 2022/0338071 A1* | 10/2022 | Suh | H04W 36/0038 |
| 2022/0394683 A1* | 12/2022 | Palenius | H04W 88/02 |
| 2023/0076249 A1* | 3/2023 | Suh | H04W 36/0033 |

OTHER PUBLICATIONS

VIVO: "Conclusion Considerations for RACS Key issue#1", 3GPP Draft, S2-1812399, SA WG2 Meeting #129bis, 3rd Generation Partnership Project (3GPP), Mobile Competence Centre, 650, Route Des Lucioles, F-06921 Sophia-Antipolis Cedex, France, vol. SA WG2, No. West Palm Beach, USA, Nov. 26, 2018-Nov. 30, 2018, Nov. 20, 2018 (Nov. 20, 2018), XP051563912, 3 Pages, Retrieved from the Internet: URL:http://www.3gpp.org/ftp/Meetings%5F3GPP%5FSYNC/SA2/Docs/S2%2D1812399%2Ezip [retrieved on Nov. 20, 2018] paragraph [0008] p. 1, example Proposal 3.

VIVO: "UE Radio Capability Update", 3GPP Draft, 3GPP TSG-CT WG1 Meeting #111bis, C1-184212-UE Radio Capability Update, 3rd Generation Partnership Project(3GPP), Mobile Competence Centre, 650, Route Des Lucioles, F-06921 Sophia-Antipolis Cedex, France, vol. CT WG1, No. Sophia-Antipolis (France), Jul. 9, 2018-Jul. 13, 2018, Jul. 6, 2018 (Jul. 6, 2018), XP051465715, 7 Pages, Retrieved from the Internet: URL:http://www.3gpp.org/ftp/Meetings%5F3GPP%5FSYNC/CT1/Docs [retrieved on Jul. 6, 2018] p. 6, paragraph 8.2.6.x-p. 7, paragraph 9.10.3.xx.

Ericsson, et al., "UE Radio Capability ID Availability Indication at Mobility TAU", 3GPP TSG-CT WG1 Meeting #120, CP-193113, C1-196700, 3rd Generation Partnership Project, Mobile Competence Centre, 650, Route Des Lucioles, F-06921 Sophia-Antipolis Cedex, France, vol. CT WG1, No. Portoroz (Slovenia), Oct. 7, 2019-Oct. 11, 2019, 11 Pages, Dec. 2, 2019, XP051833793.

Vodafone: "Completion of UE Capability Handling in LTE/SAE", 3GPP TSG SA WG2 Meeting #67, S2-085715, 3rd Generation Partnership Project, Mobile Competence Centre, 650, Route Des Lucioles, F-06921 Sophia-Antipolis Cedex, France, vol. SA WG2, No. Sophia, Aug. 25, 2008-Aug. 29, 2008, 5 Pages, Aug. 19, 2008 (Aug. 19, 2008), XP050267732.

3GPP: "3rd Generation Partnership Project; Technical Specification Group Core Network and Terminals, Non-Access-Stratum (NAS) Protocol for 5G System (5GS), Stage 3, (Release 16)", 3GPP TS 24.501 V16.4.1, Mar. 2020, 666 Pages.

Nokia, et al., "Inclusion of Attach Request Message in Registration Request Message During Initial Registration When 5G-GUTI Mapped from 4G-GUTI is used", 3GPP TSG-CT WG1 Meeting #123-e, C1-202929, Electronic meeting, Apr. 16-24, 2020, Apr. 23, 2023, 6 Pages.

\* cited by examiner

DELAYING UE RADIO CAPABILITY ID (URCID) UPDATE FOR EPLMN

PRIORITY CLAIM(S)

This application claims benefit of and the priority to U.S. Provisional Application No. 63/026,635, filed on May 18, 2020, which is expressly incorporated by reference in its entirety as if fully set forth below and for all applicable purposes.

BACKGROUND

Field of the Disclosure

Aspects of the present disclosure relate to wireless communications, and more particularly, to techniques for updating a UE radio capability ID (URCID) when a UE moves within a registration area.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communication in integrated access and backhaul systems.

Certain aspects provide a method for wireless communications by a user equipment (UE). The method generally includes receiving at least one UE radio capability identifier (URCID) assigned by a first public land mobile network (PLMN) and taking one or more actions to delay or avoid updating the URCID when moving to a second PLMN in a same registration area as the first PLMN.

Certain aspects of the present disclosure are directed to an apparatus for wireless communication by a UE. The apparatus generally includes a memory and at least one processor coupled to the memory, the memory and the at least one processor being configured to receive at least one URCID assigned by a first PLMN, and take one or more actions to delay or avoid updating the URCID when moving to a second PLMN in a same registration area as the first PLMN.

Certain aspects of the present disclosure are directed to an apparatus for wireless communication by a UE. The apparatus generally includes means for receiving at least one URCID assigned by a first PLMN, and means for taking one or more actions to delay or avoid updating the URCID when moving to a second PLMN in a same registration area as the first PLMN.

Certain aspects of the present disclosure are directed to a computer readable medium having instructions stored thereon for receiving at least one URCID assigned by a first PLMN, and taking one or more actions to delay or avoid updating the URCID when moving to a second PLMN in a same registration area as the first PLMN.

To the accomplishment of the foregoing and related ends, the one or more aspects including the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
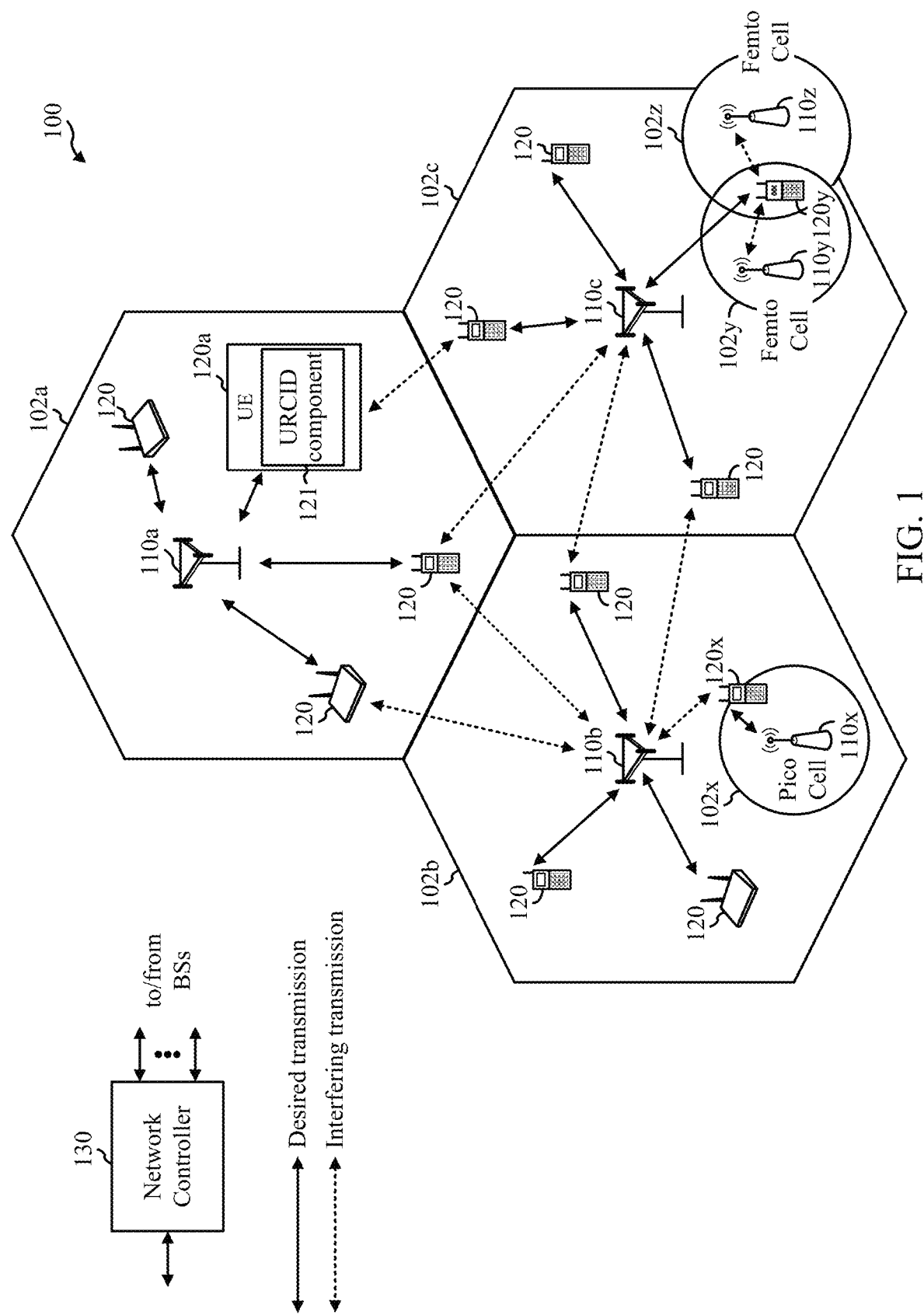
FIG. 1 is a block diagram conceptually illustrating an example wireless system, in accordance with certain aspects of the present disclosure.

Aspects of the present disclosure relate to wireless communications, and more particularly, to techniques for updating a user equipment (UE) radio capability ID (URCID) when a UE moves within a registration area. The techniques may help avoid unnecessary signaling traffic and reduce UE power consumption.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), an IAB node (e.g., an IAB donor node, an IAB parent node, and an IAB child node), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem (such as an AR/VR console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates an example wireless communication network 100 in which aspects of the present disclosure may be performed. For example, as shown in FIG. 1, a UE 120a may include a UE radio capability identifier (URCID) component 121 and be configured to perform operations 700 of FIG. 7 to delay or avoid updating a URCID. Furthermore, a base station (BS) 110 (also referred to herein as an access point (AP) 110) may be configured to perform operations complementary to those performed by the UE 120a to provide at least one URCID.

The wireless communication network 100 may, for example, be a New Radio (NR) or 5G network. As illustrated in FIG. 1, the wireless communication network 100 may include a number of APs 110 and other network entities. An AP may be a station that communicates with user equipment (UEs). Each AP 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR AP, 5G NB, or transmission reception point (TRP) may be interchangeable. In some examples, a cell may not necessarily be stationary, and the geographic area of the cell may move according to the location of a mobile AP. In some examples, the access points may be interconnected to one another and/or to one or more other access points or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

An AP may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). An AP for a macro cell may be referred to as a macro AP. An AP for a pico cell may be referred to as a pico AP. An AP for a femto cell may be referred to as a femto AP or a home AP. In the example shown in FIG. 1, the APs 110a, 110b and 110c may be macro APs for the macro cells 102a, 102b and 102c, respectively. The AP 110x may be a pico AP for a pico cell 102x. The APs 110y and 110z may be femto APs for the femto cells 102y and 102z, respectively. An AP may support one or multiple (e.g., three) cells.

Wireless communication network 100 may also include relay stations. A relay station is a station that receives a transmission of data and/or other information from an upstream station (e.g., an AP or a UE) and sends a transmission of the data and/or other information to a downstream station (e.g., a UE or an AP). A relay station may also be a UE that relays transmissions for other UEs. In the example shown in FIG. 1, a relay station may communicate with the AP 110a and a UE 120a in order to facilitate communication between the AP 110a and the UE 120a. A relay station may also be referred to as an IAB node, a relay AP, a relay, etc.

Wireless communication network 100 may be a heterogeneous network that includes APs of different types, e.g., macro AP, pico AP, femto AP, relays, etc. These different types of APs may have different transmit power levels, different coverage areas, and different impact on interference in the wireless communication network 100. For example, macro AP may have a high transmit power level (e.g., 20 Watts) whereas pico AP, femto AP, and relays may have a lower transmit power level (e.g., 1 Watt).

Wireless communication network 100 may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for both synchronous and asynchronous operation.

A network controller 130 may couple to a set of APs and provide coordination and control for these APs. The network controller 130 may communicate with the APs 110 via a backhaul. The APs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with an AP, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., an AP) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Access points are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving AP, which is an AP designated to serve the UE on the downlink and/or uplink. A finely dashed line with double arrows indicates interfering transmissions between a UE and an AP.

Figure 2:
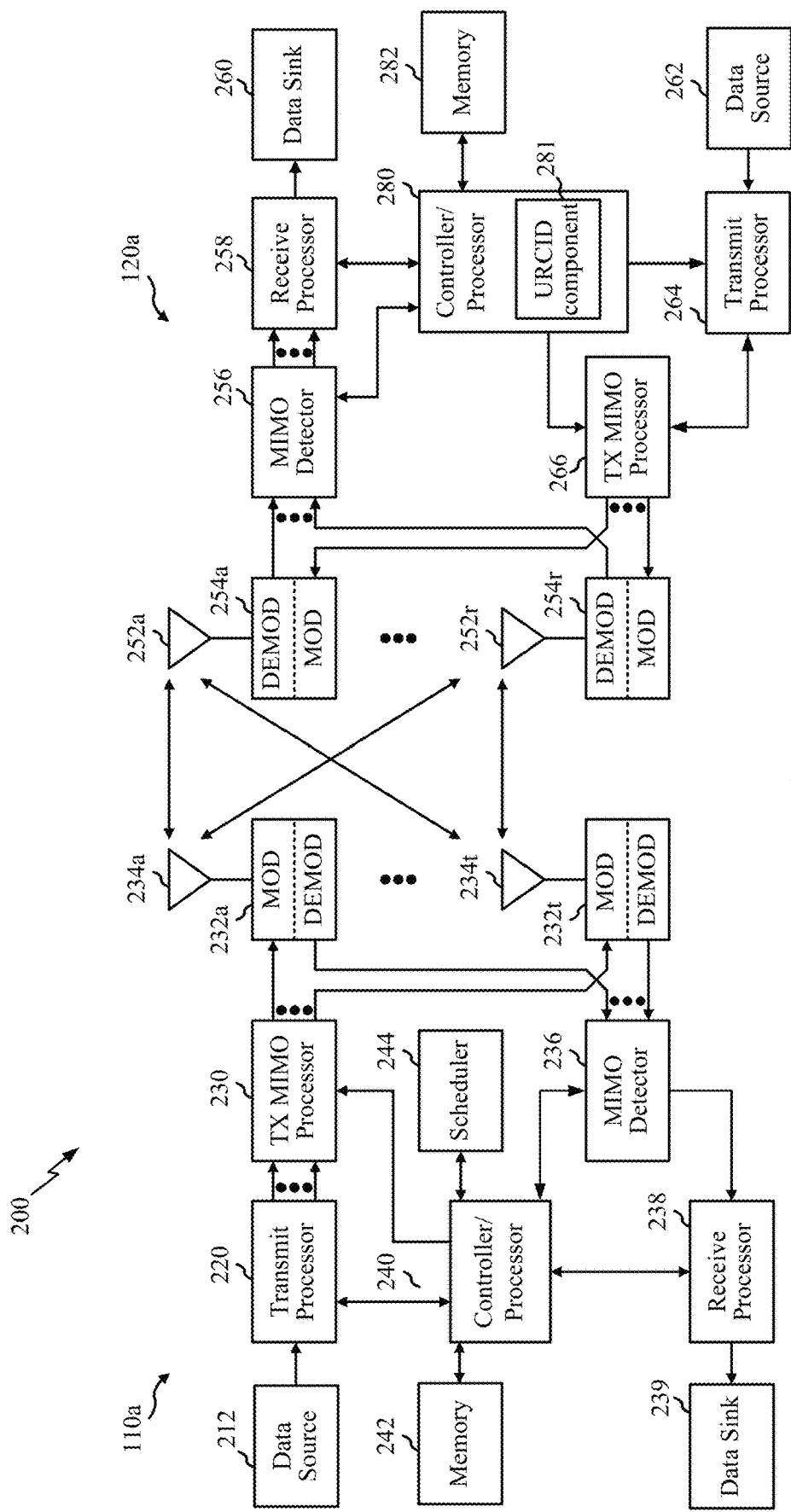
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a base station may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Figure 7:
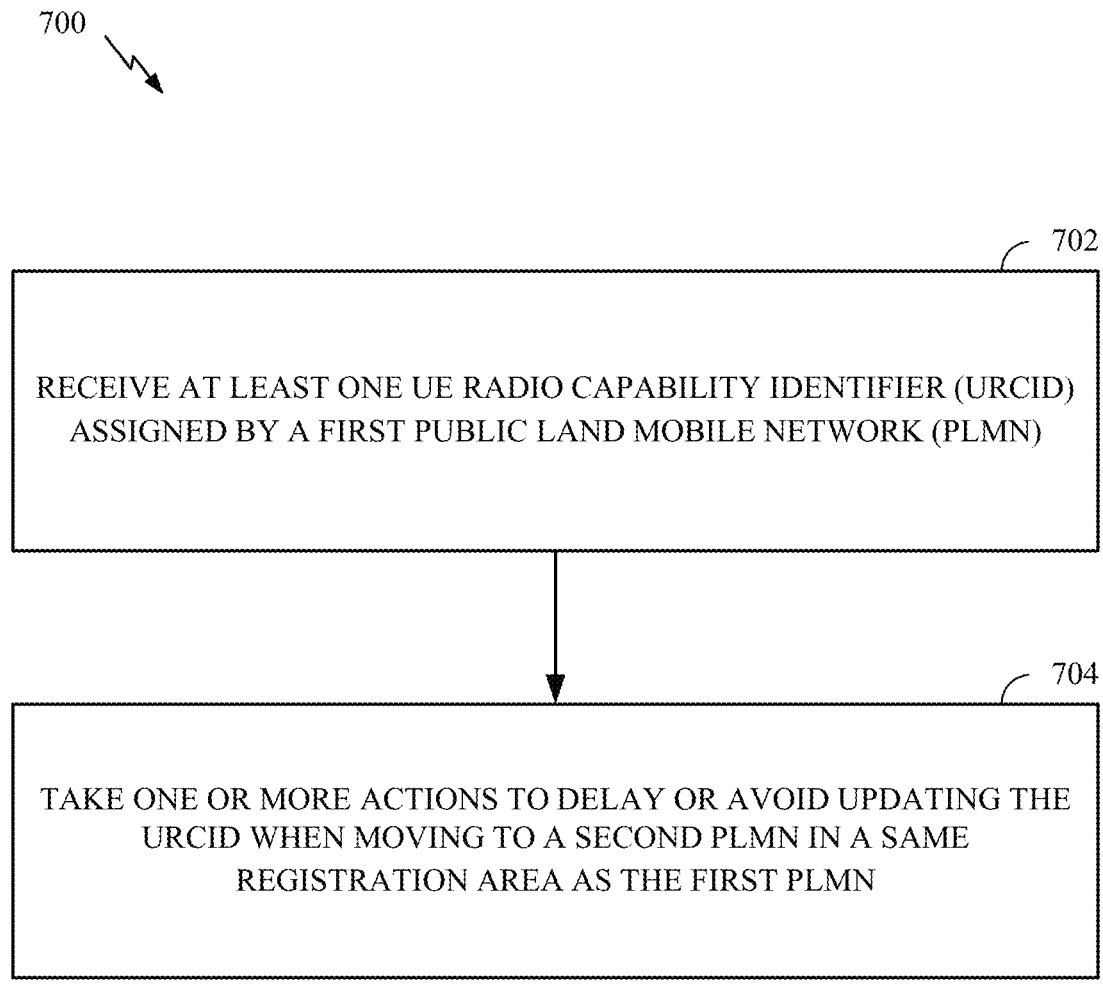
FIG. 7 illustrates example operations for wireless communications by a user equipment (UE), in accordance with certain aspects of the present disclosure.

The controller/processor 280 (and/or other processors) and modules at the UE 120a may include a URCID component 281 configured to perform or direct the execution of processes for the techniques described herein such as the operations 700 of FIG. 7. Although shown at the controller/processor, other components of the UE 120a and BS 110a may be used to perform the operations described herein.

Figure 3:
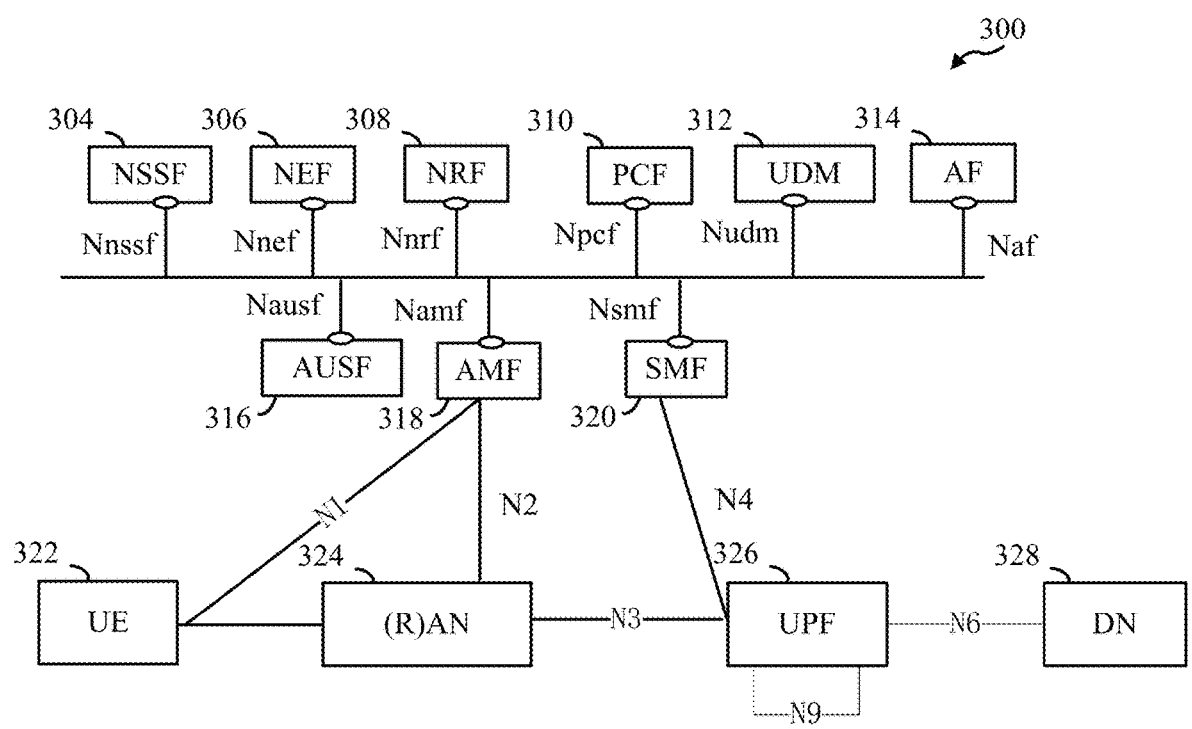
FIG. 3 is a block diagram illustrating an example architecture of a core network (CN) and radio access network (RAN), in accordance with certain aspects of the present disclosure.

FIG. 3 is a block diagram illustrating an example architecture of a core network (CN) 300 in communication with a RAN 324, in accordance with certain aspects of the present disclosure. As shown in FIG. 3, the example architecture includes the CN 300, RAN 324, UE 322, and data network (DN) 328 (e.g. operator services, Internet access or third party services).

The CN 300 may host core network functions. CN 300 may be centrally deployed. CN 300 functionality may be offloaded (e.g., to advanced wireless services (AWS)), in an effort to handle peak capacity. As shown in FIG. 3, the example CN 300 may be implemented by one or more network entities that perform network functions (NF) including Network Slice Selection Function (NSSF) 304, Network Exposure Function (NEF) 306, NF Repository Function (NRF) 308, Policy Control Function (PCF) 310, Unified Data Management (UDM) 312, Application Function (AF) 314, Authentication Server Function (AUSF) 316, Access and Mobility Management Function (AMF) 318, Session Management Function (SMF) 320; User Plane Function (UPF) 326, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 318 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 322 and SMF 320; transparent proxy for routing SM messages; access authentication; access authorization; transport for short message service (SMS) messages between UE 322 and a SMS function (SMSF); Security Anchor Functionality (SEAF); Security Context Management (SCM), which receives a key from the SEAF that it uses to derive access-network specific keys; Location Services management for regulatory services; transport for Location Services messages between UE 322 and a location management function (LMF) as well as between RAN 324 and LMF; evolved packet service (EPS) bearer ID allocation for interworking with EPS; and/or UE mobility event notification; and/or other functionality.

SMF 320 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 326 may support: packet routing and forwarding, packet inspection, quality-of-service (QoS) handling, external protocol data unit (PDU) session point of interconnect to DN 328, and anchor point for intra-RAT and inter-RAT mobility. PCF 310 may support: unified policy framework, providing policy rules to control protocol functions, and/or access subscription information for policy decisions in UDR. AUSF 316 may acts as an authentication server. UDM 312 may support: generation of Authentication and Key Agreement (AKA) credentials, user identification handling, access authorization, and subscription management. NRF 308 may support: service discovery function, and maintain NF profile and available NF instances. NSSF may support: selecting of the Network Slice instances to serve the UE 322, determining the allowed network slice selection assistance information (NSSAI), and/or determining the AMF set to be used to serve the UE 322.

NEF 306 may support: exposure of capabilities and events, secure provision of information from external application to 3GPP network, translation of internal/external information. AF 314 may support: application influence on traffic routing, accessing NEF 306, and/or interaction with policy framework for policy control.

As shown in FIG. 3, the CN 300 may be in communication with the AS 302, UE 322, RAN 324, and DN 328. In some examples, the CN 300 communicates with the external AS 302 via the NEF 306 and/or AF 314. In some examples, the CN 300 communicates with the RAN 324 (e.g., such as the BS 110a in the wireless communication network 100 illustrated in FIG. 1) and/or the UE 322 (e.g., such as the UE 120a in the wireless communication network 100 illustrated in FIG. 1) via the AMF 318.

The NSSF 304 supports the following functionality: selecting of the network slice instances to serve the UE 322; determining the allowed network slice selection assistance information (NSSAI); and/or determining the AMF set to be used to serve the UE 322.

Figure 4:
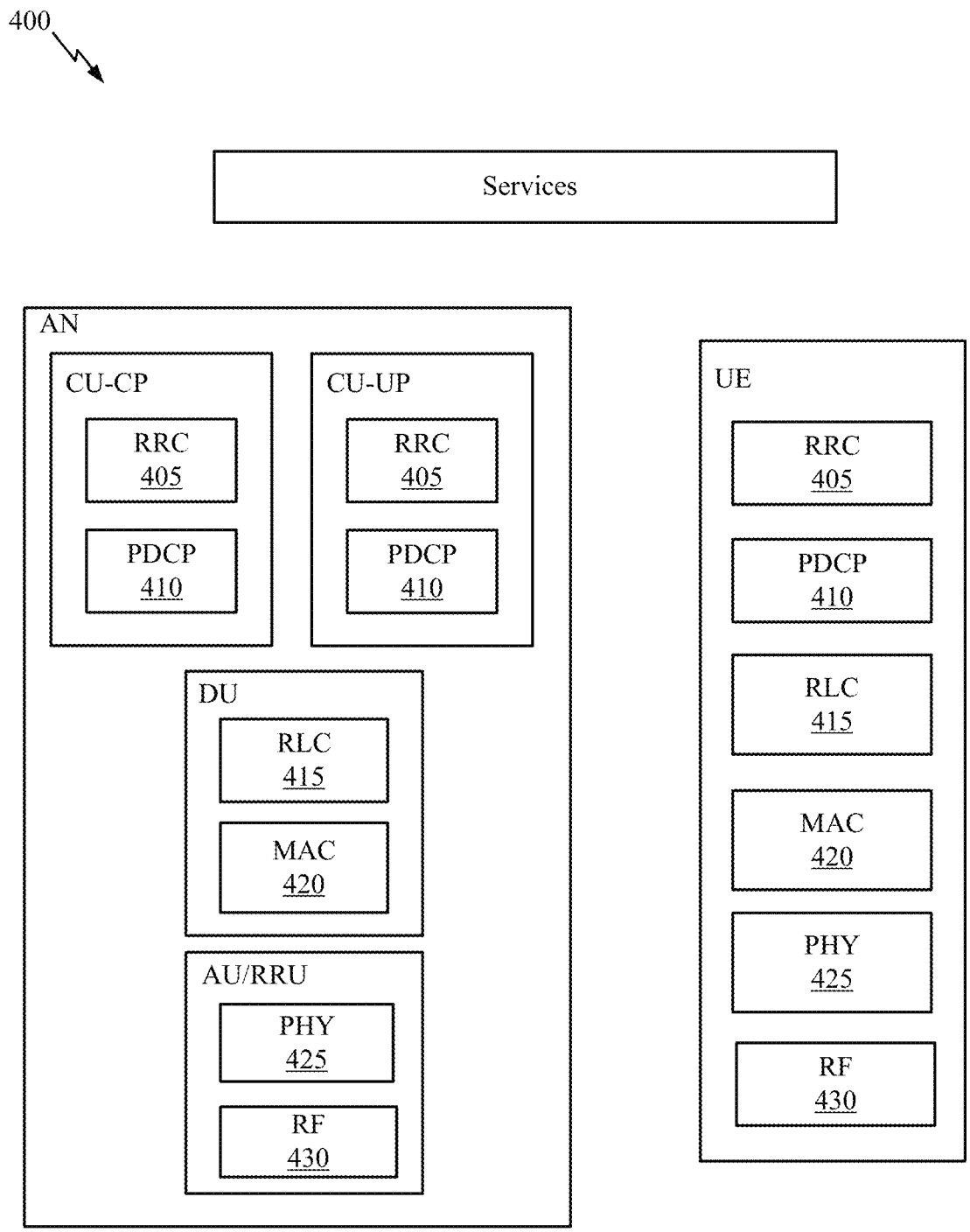
FIG. 4 is a block diagram illustrating an example communications protocol stack in a RAN, in accordance with certain aspects of the present disclosure.

FIG. 4 illustrates a diagram showing examples for implementing a communications protocol stack 400 in a RAN (e.g., such as the RAN 200), according to aspects of the present disclosure. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by an AN (e.g., AN 208 in FIG. 2, or AP 110a in FIG. 1) and/or the UE (e.g., UE 120).

As shown in FIG. 4, the protocol stack 400 is split in the AN. The RRC layer 405, PDCP layer 410, RLC layer 415, MAC layer 420, PHY layer 425, and RF layer 430 may be implemented by the AN. For example, the CU-CP and the CU-UP each may implement the RRC layer 405 and the PDCP layer 410. A DU may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 120a of FIG. 1) may implement the entire protocol stack 400 (e.g., the RRC layer 405, the PDCP layer 410, the RLC layer 415, the MAC layer 420, the PHY layer(s) 425, and the RF layer(s) 430).

Figure 5:
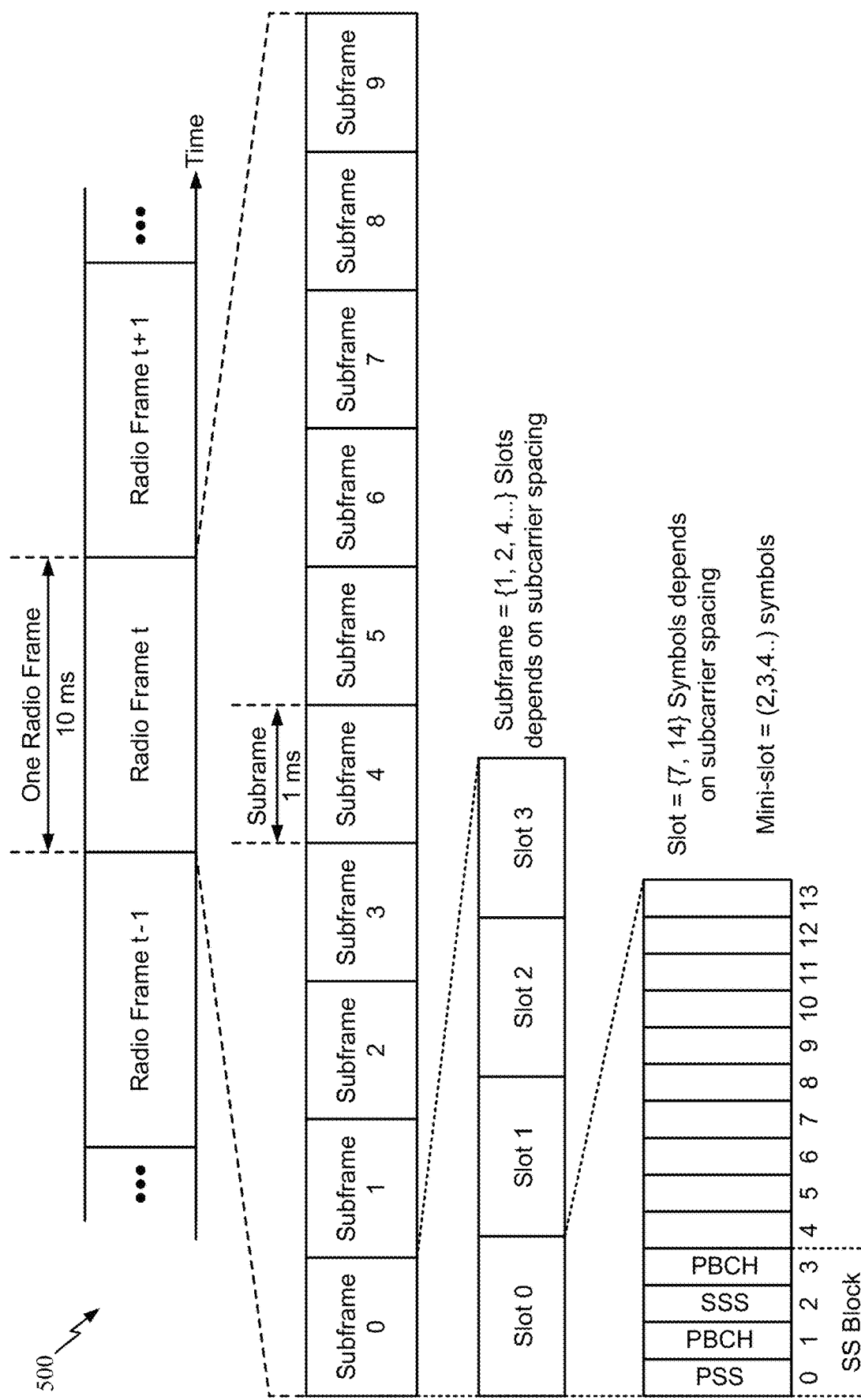
FIG. 5 is a block diagram is a diagram illustrating an example of a frame format for new radio (NR), in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Example Delaying/Avoiding of URCID Update for EPLMN

Aspects of the present disclosure relate to wireless communications, and more particularly, to techniques for updating a user equipment (UE) radio capability ID (URCID) when a UE moves to a new public land mobile network (PLMN) within a registration area. The techniques may help avoid unnecessary signaling traffic and reduce UE power consumption.

For (re)selection, a PLMN is identified by its PLMN identity broadcast within a system information block (SIB) (e.g., SIB-1). A single cell can belong to multiple PLMNs, so SIB-1 may broadcast a list of PLMN identities. The steps for PLMN selection generally include a UE non-access stratum (NAS) layer request of an access stratum (AS) layer to report available PLMN(s). Then the UE NAS layer is responsible for selecting a PLMN from these list of reported PLMN.

The UE typically scans radio frequency (RF) channels within its supported RF bands, and searches for the strongest cell carrier and reads SIBs to identify the PLMN. The UE may enhance a PLMN search procedure using stored information such as RF carriers and cell parameters. The NAS layer can stop searching at any point, such as after finding a home PLMN.

From the reported PLMN list, a UE utilizes user subscriber identity module (USIM) information for PLMN selection. Equivalent PLMNs refer to a set of PLMNs which are equivalent to a PLMN with which the UE is registering. This set can be updated during attach or tracking area update procedures.

In some cases, the reselection may be based on a desire for the UE to switch between different capabilities, for example, based on the region/location of the UE. For example, operators generally have different deployments in different regions (e.g., with some regions having 400 MHz vs some regions having 800 MHz mmW). To manipulate or workaround a certain network configurations (e.g., the network may configure a maximum layers on LTE, and give a minimum bandwidth to NR, even though the UE is indicating 800 MHz allowed on mmW, via a band combination), the UE can switch between different UE radio capabilities. In this example, the UE can have a capability U1 listing band combinations with 400 MHz and U2 listing only 800 MHz band combinations. When the UE is in a region of 400 MHz deployment, the UE may advertise U1, and, if the UE moves to an 800 MHz deployment region, then the UE may set a different capability U2 in a service request procedure and cause network to use 800 MHz related band combination list.

In current systems that utilize radio capability signaling (RACS), a URCID is assigned by an individual PLMN, and URCIDs are not applicable across PLMNs (even EPLMNs). This constraint can cause certain issues in terms of network signaling traffic and UE power consumption. When the UE reselects to an EPLMN (e.g., while in IDLE), the UE has to perform registration procedure with the new PLMN to inform the network about the applicable UE radio capability ID to the network.

Figure 6:
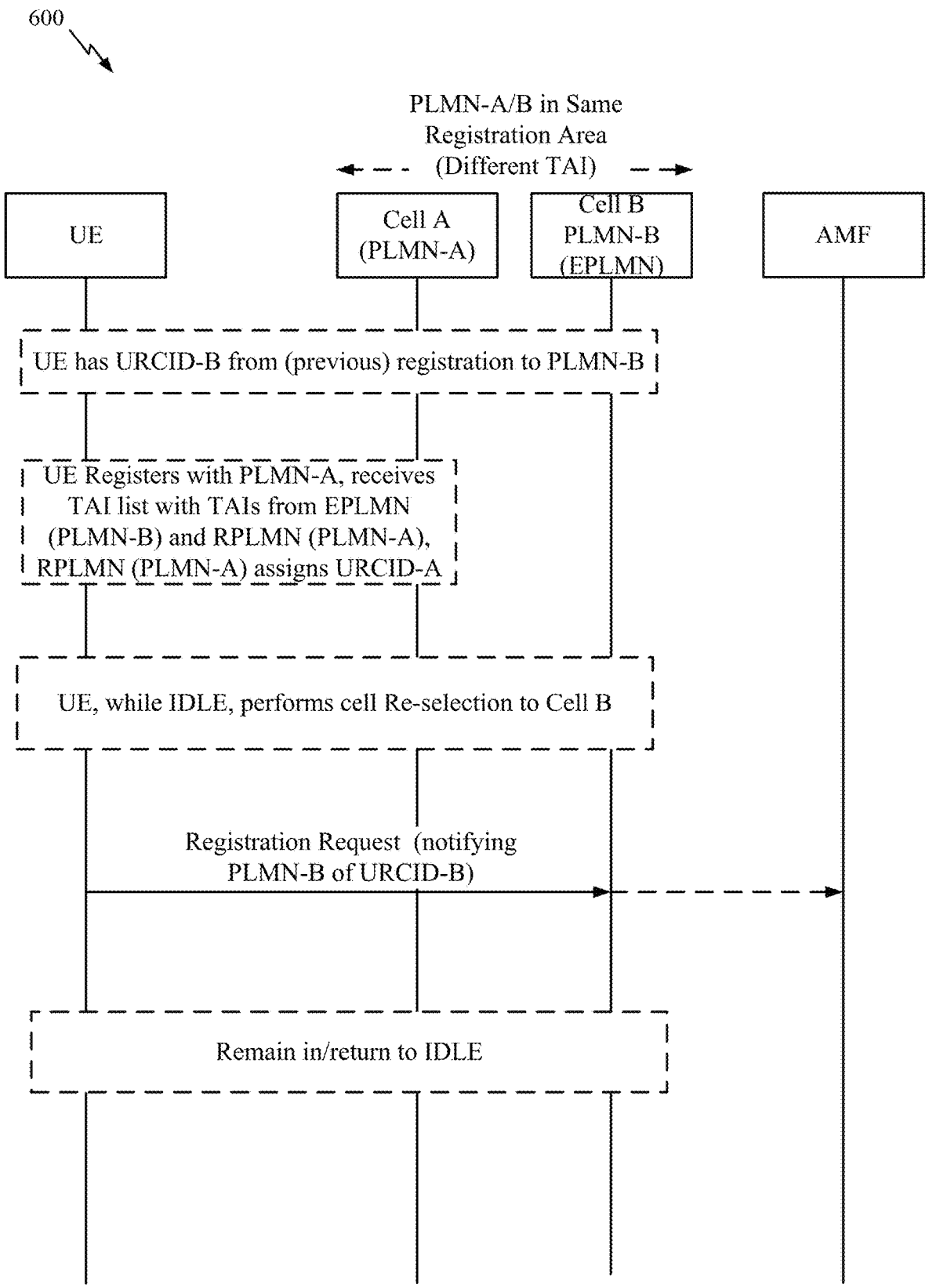
FIG. 6 is a call flow diagram illustrating relaying pre-decoded samples of a packet, in accordance with certain aspects of the present disclosure.

This procedure is illustrated in the call flow diagram of FIG. 6, which assumes the UE has already been assigned a UE radio capability ID (URCID-B), from a past/previous registration to an EPLMN (PLMN-B).

When the UE subsequently registers in RPLMN (PLMN-A), the network sends the UE a tracking area identifier (TAI) list containing TAIs from the EPLMN (PLMN-B) and the RPLMN (PLMN-A). The RPLMN (PLMN-A) also assigns the UE radio capability ID (URCID-A).

In the illustrated example, the UE, while in an idle mode, moves to EPLMN (reselect PLMN-B). Under the constraint(s) mentioned above, the UE is required to send a registration request to EPLMN (PLMN-B), for notification of the previously assigned URCID (URCID-B).

The constraint effectively means that a RACS-supporting UE with a URCID assigned by one PLMN will have to trigger mobility registration every time it crosses PLMN boundaries, even if the UE is registered in a tracking area (TA)-list that contains tracking area codes (TACs) from equivalent PLMNs.

This will generate unnecessary signaling traffic since the URCID will be of use to the network only when the UE is going to connection management (CM) connected mode. This unnecessary signaling is costly from a UE power consumption perspective.

Aspects of the present disclosure, therefore, provide techniques for a UE to delay (or avoid) initiation of a procedure that is designed for updating the URCID when the UE changes PLMNs (but is still within the same registration area).

For example, in order to avoid an unnecessary transmission(s) of registration request(s), the UE may wait to update the URCID in a service request procedure or registration request, only for transition to CM-CONNECTED mode (e.g., due to a paging or MO voice/data call).

In other words, when the UE changes PLMN within the same registration area, the network has all the UE radio capability information necessary to successfully page the UE. Thus, it may not be necessary for the UE to immediately report the URCID that is applicable in an EPLMN and there may be no need for a special trigger of mobility registration when a UE crosses PLMN boundaries, for example, between a registered PLMN (RPLMN) and an EPLMN.

FIG. 7 illustrates example operations 700 for wireless communication by a UE, in accordance with certain aspects of the present disclosure. The operations 700 may be performed, for example, by a UE 120 (e.g., any of the UEs shown in FIG. 1 or 2).

Operations 700 begin, at 702, by receiving at least one URCID assigned by a first PLMN. At 704, the UE takes one or more actions to delay or avoid updating the URCID when moving to a second PLMN in a same registration area as the first PLMN.

Figure 8:
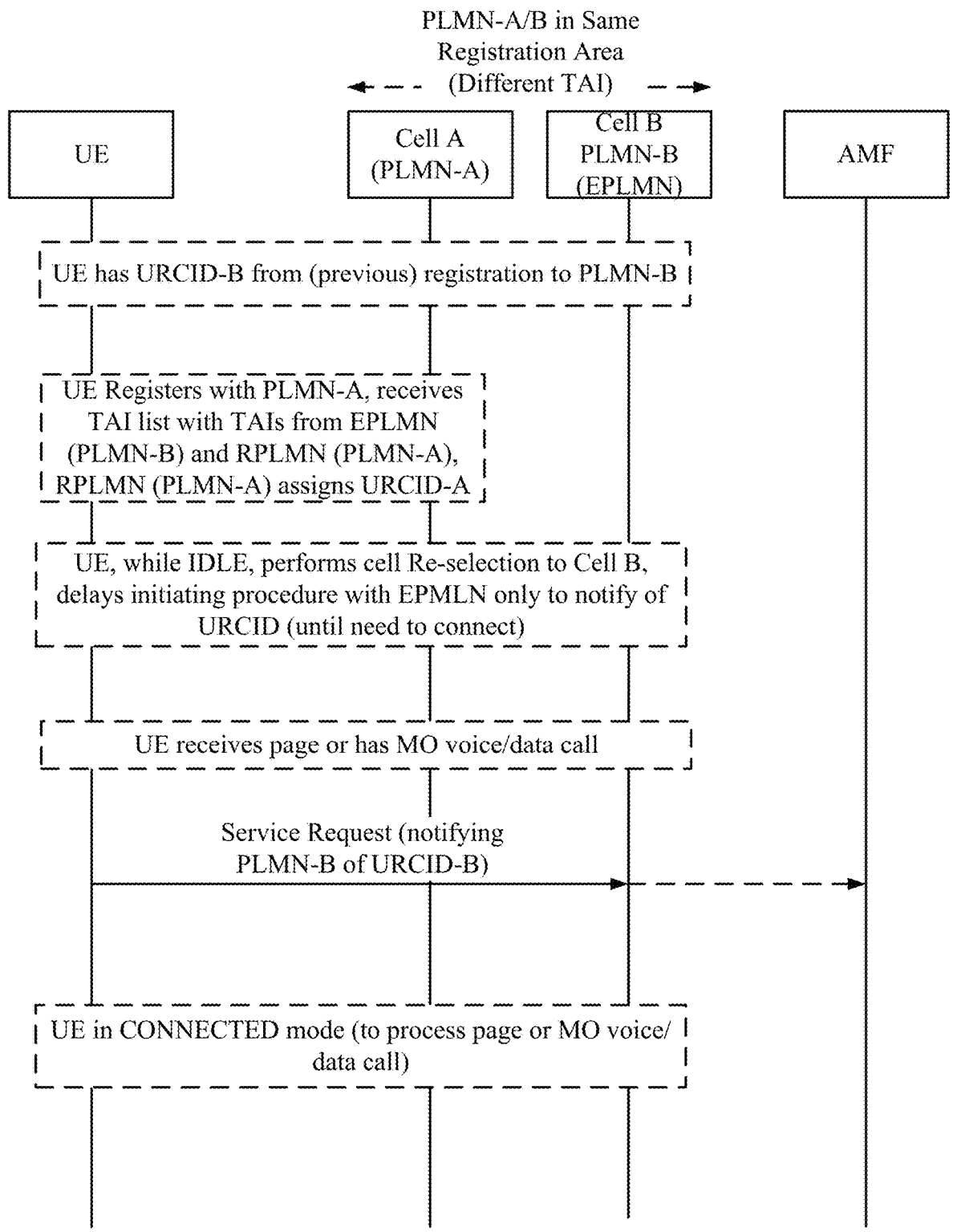
FIG. 8 is a call flow diagram illustrating relaying pre-decoded samples of a packet, in accordance with certain aspects of the present disclosure.

Operations 700 of FIG. 7 may be understood with reference to the call flow diagram 800 of FIG. 8, to delay or avoid unnecessarily sending a registration request for the sole purpose of URCID notification.

The example of FIG. 8 again assumes that the UE has already been assigned a URCID (e.g., URCID-B), from a past/previous registration to an EPLMN (e.g., PLMN-B) and that the UE subsequently registers in RPLMN (e.g., PLMN-A).

In contrast to the example shown in FIG. 6, in this example, when the UE, while in an idle state, moves to the EPLMN (e.g., reselecting PLMN-B) within the same registration area, and has no immediate need to setup a data connection, it does not send a registration request to EPLMN (PLMN-B) immediately for notification of the previously assigned URCID (URCID-B).

Rather, the UE delays the URCID notification until the UE is ready to transition to connected mode (e.g., due to paging or an MO data/voice call). As illustrated, the UE sends the URCID in a service request procedure (or registration request), but only for transition to a connected mode connected state (CM-CONNECTED).

Thus, utilizing the proposed technique, there may be no need for a special trigger of mobility registration when the UE crosses PLMN boundaries (e.g. between RPLMN and EPLMN). As a result, the UE may avoid unnecessary signaling traffic, which may help reduce UE power consumption.

In some cases, the UE can use such a service request procedure to dynamically update a URCID to use. For example, a UE may be assigned URCIDs U1 and U2 by the network (e.g., through different registration procedures performed in past).

In certain aspects, each URCID may correspond to different radio capability settings on the UE. For example, as noted above, U1 may correspond to UE capability information containing a first list of band combinations, and U2 may correspond to UE capability information containing a second (different) list of band combinations. In a registration request, the UE can send URCID U1. Subsequently, in the service request, the UE can indicate URCID U2, thus effectively requesting a switch to U2.

Example Aspects

Figure 9:
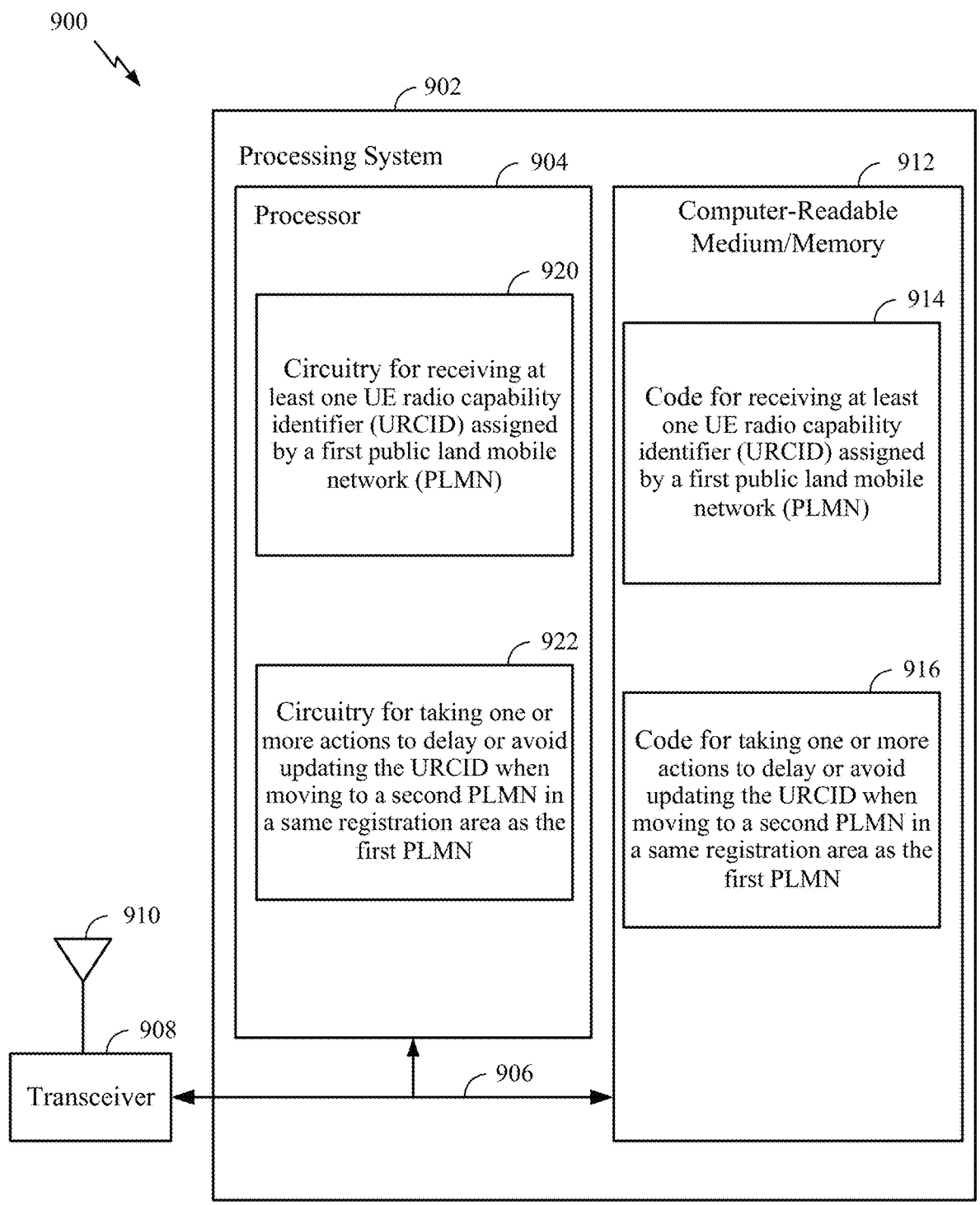
FIG. 9 is an example apparatus with components capable of performing operations, in accordance with certain aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for switching between a PC5 path and a Uu path. In certain aspects, computer-readable medium/memory 912 stores code 914 for receiving at least one UE radio capability identifier (URCID) assigned by a first public land mobile network (PLMN); and code 916 for taking one or more actions to delay or avoid updating the URCID when moving to a second PLMN in a same registration area as the first PLMN. In certain aspects, the processor 904 has circuitry configured to implement the code stored in the computer-readable medium/memory 912. The processor 904 includes circuitry 920 for receiving at least one UE radio capability identifier (URCID) assigned by a first public land mobile network (PLMN); and circuitry 922 for taking one or more actions to delay or avoid updating the URCID when moving to a second PLMN in a same registration area as the first PLMN.

Example Aspects

Aspect 1. A method for wireless communications by a user equipment (UE), comprising receiving at least one UE radio capability identifier (URCID) assigned by a first public land mobile network (PLMN); and taking one or more actions to delay or avoid updating the URCID when moving to a second PLMN in a same registration area as the first PLMN.

Aspect 2. The method of Aspect 1, wherein the first and second PLMNs are equivalent PLMN (EPLMNs); and the one or more actions comprise delaying initiating a procedure associated with notifying the second PLMN of the URCID.

Aspect 3. The method of Aspect 2, wherein the one or more actions further comprise using a registration request procedure to notify the second PLMN of the URCID, when the UE initiates a connection with EPLMN.

Aspect 4. The method of Aspect 2 or 3, wherein the one or more actions further comprise using a service request procedure to notify the second PLMN of the URCID, when the UE initiates a connection with EPLMN.

Aspect 5. The method of Aspect 4, wherein the UE initiates the connection with the EPLMN due to at least one of paging or a mobile originated voice or data call.

Aspect 6. The method of any of Aspects 1-5, wherein: the UE is assigned at least first and second URCIDs through different registration procedures, each corresponding to a different radio capability setting; and the UE signals the first URCID in a registration request.

Aspect 7. The method of Aspect 6, wherein the UE signals the second URCID in a service request, as a request to switch from the first URCID to the second URCID.

Aspect 8: An apparatus, comprising: a memory comprising executable instructions; and one or more processors configured to execute the executable instructions and cause the apparatus to perform a method in accordance with any one of Aspects 1-7.

Aspect 9: An apparatus, comprising means for performing a method in accordance with any one of Aspects 1-7.

Aspect 10: A non-transitory computer-readable medium comprising executable instructions that, when executed by one or more processors of an apparatus, cause the apparatus to perform a method in accordance with any one of Aspects 1-7.

Aspect 11: A computer program product embodied on a computer-readable storage medium comprising code for performing a method in accordance with any one of Aspects 1-7.

Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 238) or an antenna(s) 234 of the access point 110 or the receive processor 258 or antenna(s) 252 of the UE 120 illustrated in FIG. 2. Means for transmitting or means for outputting may include a transmitter (such as the transmit processor 220) or an antenna(s) 234 of the access point 110 or the transmit processor 264 or antenna(s) 252 of the UE 120 illustrated in FIG. 2. Means for associating, means for determining, means for monitoring, means for deciding, means for providing, means for detecting, means for performing, and/or means for setting may include a processing system, which may include one or more processors, such as the receive processor 238/258, the transmit processor 220/264, the TX MIMO processor 230/266, or the controller 240/280 of the access point 110 and UE 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for wireless communications at a user equipment (UE), comprising:
receiving at least one UE radio capability identifier (URCID) associated with a first public land mobile network (PLMN);
delaying or avoiding updating the at least one URCID when moving to a second PLMN in a same registration area as the first PLMN; and
performing a registration request procedure with the second PLMN to notify the second PLMN of the at least one URCID when the UE initiates a connection with the second PLMN.

2. The method of claim 1, wherein:
the first and second PLMNs are equivalent PLMN (EPLMNs); and
delaying or avoiding updating the at least one URCID comprises delaying initiating a procedure associated with notifying the second PLMN of the at least one URCID.

3. The method of claim 1, further comprising using a service request procedure to notify the second PLMN of the at least one URCID when the UE initiates the connection with the second PLMN.

4. The method of claim 1, wherein the UE initiates the connection with the second PLMN due to at least one of paging or a mobile originated voice or data call.

5. The method of claim 1, wherein:
the at least one URCID comprises a first URCID and a second URCID;
the UE is assigned the first URCID and the second URCID through different registration procedures, each corresponding to a different radio capability setting; and
the UE notifies the second PLMN of the first URCID in a registration request of the registration request procedure.

6. The method of claim 5, further comprising notifying the second PLMN of the second URCID in a service request as a request to switch from the first URCID to the second URCID.

7. A user equipment (UE), comprising:
means for receiving at least one UE radio capability identifier (URCID) associated with a first public land mobile network (PLMN);
means for delaying or avoiding updating the at least one URCID when moving to a second PLMN in a same registration area as the first PLMN; and
means for performing a registration request procedure with the second PLMN to notify the second PLMN of the at least one URCID when the UE initiates a connection with the second PLMN.

8. The UE of claim 7, wherein:
the first and second PLMNs are equivalent PLMN (EPLMNs); and
the means for delaying or avoiding updating the at least one URCID comprise means for delaying initiating a procedure associated with notifying the second PLMN of the at least one URCID.

9. The UE of claim 7, further comprising means for using a service request procedure to notify the second PLMN of the at least one URCID when the UE initiates the connection with the second PLMN.

10. The UE of claim 7, wherein the UE initiates the connection with the second PLMN due to at least one of paging or a mobile originated voice or data call.

11. The UE of claim 7, wherein:
the at least one URCID comprises a first URCID and a second URCID;
the UE is assigned the first URCID and the second URCID through different registration procedures, each corresponding to a different radio capability setting; and
the UE further comprises means for notifying the second PLMN of the first URCID in a registration request of the registration request procedure.

12. The UE of claim 11, further comprising means for notifying the second PLMN of the second URCID in a service request as a request to switch from the first URCID to the second URCID.

13. An apparatus for wireless communication, comprising:
one or more processors individually or collectively configured to execute instructions stored on one or more memories to cause the apparatus to:
obtain at least one UE radio capability identifier (URCID) associated with a first public land mobile network (PLMN);
delay or avoid updating the at least one URCID when moving to a second PLMN in a same registration area as the first PLMN; and
perform a registration request procedure with the second PLMN to notify the second PLMN of the at least one URCID when the apparatus initiates a connection with the second PLMN.

14. The apparatus of claim 13, wherein:
the first and second PLMNs are equivalent PLMN (EPLMNs); and
in order to delay or avoid updating the at least one URCID, the one or more processors are configured to cause the apparatus to delay initiating a procedure associated with notifying the second PLMN of the at least one URCID.

15. The apparatus of claim 13, wherein the one or more processors are further configured to cause the apparatus to use a service request procedure to notify the second PLMN of the at least one URCID when the apparatus initiates the connection with the second PLMN.

16. The apparatus of claim 13, wherein the one or more processors are further configured to cause the apparatus to initiate the connection with the second PLMN due to at least one of paging or a mobile originated voice or data call.

17. The apparatus of claim 13, wherein:
the at least one URCID comprises a first URCID and a second URCID;
the apparatus is assigned the first URCID and the second URCID through different registration procedures, each corresponding to a different radio capability setting; and
the one or more processors are further configured to cause the apparatus to notify the second PLMN of the first URCID in a registration request of the registration request procedure.

18. The apparatus of claim 17, wherein the one or more processors are further configured to cause the apparatus to notify the second PLMN of the second URCID in a service request as a request to switch from the first URCID to the second URCID.

19. A user equipment (UE), comprising:
a receiver configured to receive at least one UE radio capability identifier (URCID) associated with a first public land mobile network (PLMN); and
one or more processors individually or collectively configured to execute instructions stored on one or more memories to cause the UE to:
delay or avoid updating the at least one URCID when moving to a second PLMN in a same registration area as the first PLMN; and
perform a registration request procedure with the second PLMN to notify the second PLMN of the at least one URCID when the UE initiates a connection with the second PLMN.

20. The UE of claim 19, wherein:
the first and second PLMNs are equivalent PLMN (EPLMNs); and
in order to delay or avoid updating the at least one URCID, the one or more processors are configured to cause the UE to delay initiating a procedure associated with notifying the second PLMN of the at least one URCID.

21. The UE of claim 19, wherein the one or more processors are further configured to cause the UE to use a service request procedure to notify the second PLMN of the at least one URCID when the UE initiates the connection with the second PLMN.

22. The UE of claim 19, wherein the one or more processors are further configured to cause the UE to initiate the connection with the second PLMN due to at least one of paging or a mobile originated voice or data call.

23. The UE of claim 19, wherein:
the at least one URCID comprises a first URCID and a second URCID;
the UE is assigned the first URCID and the second URCID through different registration procedures, each corresponding to a different radio capability setting; and
the one or more processors are further configured to cause the UE to notify the second PLMN of the first URCID in a registration request of the registration request procedure.

24. The UE of claim 23, wherein the one or more processors are further configured to cause the UE to notify the second PLMN of the second URCID in a service request as a request to switch from the first URCID to the second URCID.

* * * * *